United States Patent [19]

Pepe et al.

[11] Patent Number: 5,673,322
[45] Date of Patent: Sep. 30, 1997

[54] SYSTEM AND METHOD FOR PROVIDING PROTOCOL TRANSLATION AND FILTERING TO ACCESS THE WORLD WIDE WEB FROM WIRELESS OR LOW-BANDWIDTH NETWORKS

[75] Inventors: David Mathew Pepe, Middletown; Lisa B. Blitzer, Manalapan; James Joseph Brockman, Perrineville; William Cruz, Eatontown; Dwight Omar Hakim, Matawan; Richard Reid Hovey, Somerville, all of N.J.; Michael Kramer, Bronx, N.Y.; Dawn Diane Petr, Green Brook, N.J.; Josefa Ramaroson, Freehold, N.J.; Gerardo Ramirez, Bridgewater, N.J.; Yang-Wei Wang, Howell, N.J.; Robert G. White, Morristown, N.J.

[73] Assignee: Bell Communications Research, Inc., Morristown, N.J.

[21] Appl. No.: 614,612

[22] Filed: Mar. 22, 1996

[51] Int. Cl.[6] .................................................. H04L 9/00
[52] U.S. Cl. ................................... 380/49; 395/762
[58] Field of Search .............................. 380/49; 370/60, 370/94.1, 471; 379/90; 395/683, 762, 774

[56] References Cited

U.S. PATENT DOCUMENTS

| | | | |
|---|---|---|---|
| 4,438,511 | 3/1984 | Baran | 370/60 |
| 4,893,307 | 1/1990 | McKay et al. | 370/94.1 |
| 5,021,949 | 6/1991 | Morten et al. | 370/94.1 |
| 5,220,501 | 6/1993 | Lawlor et al. | 379/90 |
| 5,412,654 | 5/1995 | Perkins | 370/94.1 |
| 5,416,842 | 5/1995 | Aziz | 380/49 |
| 5,442,633 | 8/1995 | Perkins et al. | 370/94.1 |
| 5,448,561 | 9/1995 | Kaiser et al. | 370/471 |
| 5,481,721 | 1/1996 | Serlet et al. | 395/683 |

Primary Examiner—Salvatore Cangialosi
Attorney, Agent, or Firm—James W. Falk; Joseph Giordano

[57] ABSTRACT

An interface between a protected computer or computer network and the World Wide Web (WWW). The interface comprises a split proxy system that encapsulates TCP/IP transmissions into a script transmission, which is not subject to problems in high latency systems, thereby greatly improving WWW access, via a wireless modem or other low-bandwidth communications network. The split proxy interface also provides compression, encryption and filtering capabilities and allows receipt of unsolicited transmissions from the service provider for such purposes as automatically updating or configuring WWW access software.

29 Claims, 3 Drawing Sheets

SYSTEM AND METHOD FOR PROVIDING PROTOCOL TRANSLATION AND FILTERING TO ACCESS THE WORLD WIDE WEB FROM WIRELESS OR LOW-BANDWIDTH NETWORKS

BACKGROUND OF THE INVENTION

1. Related Patent Application

U.S. patent application Ser. No. 08/309,336, filed on Sep. 19, 1994 by David Mathew Peps, Lisa B. Blitzer, James Joseph Brockman, William Cruz, Dwight Omar Hakim, Michael Kramer, Dawn Dian Petr, Josefa Ramaroson, Gerardo Ramirez, Yang-Wei Wang, and Robert G. White, discloses subject matter related to the present application and is hereby incorporated by reference.

2. Field of the Invention

The present invention relates to an improved interface between private computers or private computer networks and the World Wide Web (WWW) using both wireline and wireless connections. More specifically, the invention relates to an improved WWW interface with protocol translation, security and automatic configuring features.

2. Description of the Related Art

For fifty years, people have dreamed of a universal information database—data that would not only be accessible to people around the world, but organized such that related information is easily discovered and so that the most relevant data for a particular need is quickly found and accessed by a user.

In the 1960's, this idea was explored further, giving rise to visions of a "docuverse" that would revolutionize all aspects of human-information interaction, particularly in the educational field. Only recently has the technology started to fulfill these visions, making it possible to implement them on a global scale.

The Internet has evolved through a cooperative effort by universities, corporations and government. Years ago, the Defense Department started interconnecting the computer networks of universities, private organizations and sometimes corporations with whom research was being conducted. This network of networks has, over time, evolved into a global network commonly referred to as the Internet or the World Wide Web (WWW). The official description for the WWW is a "wide-area hypermedia information retrieval initiative aiming to give universal access to a large universe of documents."

As the WWW became more popular and subject to wider public use, the Department of Defense curtailed its involvement. Today, many government-funded links on the Internet have been turned over to commercial enterprises that maintain the interconnection of Local Area Networks (LANs) between universities, companies, etc.

Though the WWW is proving to be an extremely valuable resource for corporate enterprises (for communicating via electronic mail (e-mail), accessing information on-line, etc.), corporations are concerned about the security of their intellectual property, trade secrets, financial records and other confidential information stored on their computer networks. There is also concern about electronic vandalism—unauthorized access of a computer network over the WWW for the purpose of destroying or distorting computerized information.

In response to these concerns, some connections to the WWW have been protected with "Network Security Firewalls." As shown in FIG. 1, a firewall is commonly a specific piece of hardware and/or software bridging the connection between a private computer or computer network (LAN) 10 and the WWW 12. The main purpose of a firewall is to screen data traffic into and out of the network that is to be protected. If a network intruder is detected, the firewall has the capability of sifting through the data traffic and disabling the intruder's access. In early forms of Internet firewalls, it was generally difficult to ascertain which data traffic was good or bad, i.e., relating to a corporate user or an intruder. This created a problem for corporate users (inside the corporate LAN) of Internet applications, such as File Transfer Protocol (FTP), because their applications would sometimes get incorrectly blocked by the firewall. The firewalls needed more intelligence about application data traversing a firewall so that desirable traffic was not hindered.

Internet engineers designed "proxy" services on Internet firewalls to meet this need. These proxies are computer processes that completely understand specific applications like an FTP application. It became a straightforward matter for network administrators to add multiple proxies to the firewall system based on the type of applications the internal corporate users wanted to execute. For example, WWW browsers (described below) would use a Hyper Text Transport Protocol (HTTP) proxy to transfer Hyper Text Markup Language (HTML) documents.

To facilitate use of the WWW, "browsing" software 6 was developed. Browsers, such as the popular Netscape™ and Mosaic™ browsers, allow WWW users to browse information available on computers linked to the WWW. A related invention by the assignee, described in U.S. patent application Ser. No. 08/309,336 (hereinafter "the '336 application), provides users on computer networks with a consistent means to access a variety of media in a simplified fashion. Making use of browsing software, the invention of the '336 application has changed the way people view and create information—it has created the first true global hypermedia network.

One responsibility of an HTTP proxy is to receive requests from browsers or software applications 6 within the protected network 10 and relay those requests to the WWW 12. The proxy also monitors access to the protected computer or network 10 from the WWW 12. Thus, the proxy 4 can allow a system administrator to monitor information and requests flowing between the protected network 10 and the WWW 12. If illicit activity is discovered, the proxy 4 can interrupt the connection to the WWW 12. This proxy-driven firewall 2, 4 allows corporations and those with similar concerns to make use of the valuable resources of the WWW 12 while maintaining a degree of security.

To effect links between computers and software applications across the WWW, protocols have been developed to govern the transmission of computerized data. A protocol organizes data to be transmitted over the WWW in a standard way recognizable by the receiving computer. There are seven layers in the open systems interconnection (OSI) model of a computer protocol. Each layer adds additional organizational capabilities that facilitate the transmission of data.

Internet Protocol (IP) is the third layer in the OSI model and the basic "language" that is spoken on the Internet. The fourth layer, Transmission Control Protocol (TCP), is a more specialized protocol contained in IP. To use the WWW, a computer must be able to communicate using a protocol that incorporates IP and, consequently, TCP.

The WWW and technologies surrounding Internet access have seen explosive growth. Many companies have evolved to allow subscribers access to the WWW using standard telephony. A group called Internet Service Providers (ISP) represents many of these service providers.

A promising area for further expansion of Internet access is wide-area wireless data networks. The wireless networks include cellular digital packet data (CDPD, provided by cellular carriers), circuit-switched cellular networks, such as the Mobitex™ network (provided by RAM Mobile data in the U.S.), the Ardis™ network, and a host of emerging national wireless data providers.

All of the listed data network providers offer traditional Internet Protocol (IP) service and are capable of integrating with the WWW. The data speeds range from 4,800 to 28,8000 bps and have latencies that range from milliseconds to 10 seconds.

Despite the popularity of the WWW, there are still technical and security issues that must be overcome in accessing the Internet. Some of these problems are particularly acute for wireless systems trying to access the WWW.

Problem 1

The first problem is caused by data latency (described in more detail below). Data latency refers to the time delays created by multiple hops and slow links as data travels across various nodes within the WWW. This particular problem is exacerbated when the WWW is accessed using a wireless modem. Most wide area wireless, and some wireline, data networks were not originally designed to support the TCP/IP protocol. Latencies are increased even further by encapsulating IP data into the networks' original data protocols.

When TCP is organizing data for transmission over the WWW, it breaks the data into discrete "packets" of information. TCP then transmits the individual packets. Each packet includes instructions to the receiving system for reassembling the packets into the complete data structure being transmitted. Each packet also includes a cyclic redundancy check that allows the receiving system to check that the packet was not corrupted or broken up during transmission.

TCP is typically configured to transmit a number of packets and then wait for a confirmation from the receiving system that the packets have been received properly. The amount of time required to transmit a data packet and receive confirmation of its arrival is known as the "latency" of the system.

If TCP does not receive confirmation that the data packet was properly received, it will assume that the packet was lost during transmission and re-transmit the packet. If the latency of the system gets too high, TCP will assume, prematurely, that the packet was lost and flood the network with re-transmissions of the same data packets before the original packets reach their destination. This is also a problem because many service providers charge users per data packet transmitted. If TCP is flooding the system with unnecessary duplicates of packets still in transmission, the cost to the user will be greatly increased. Thus, TCP cannot operate properly over a connection with a high latency. If the latency of the system exceeds approximately 3 to 5 seconds, TCP will begin to malfunction.

When the WWW is accessed over standard phone lines that do not support TCP, the TCP datagram must be encapsulated (i.e., translated) into a form that can be sent over the telephone line. The datagram is then unpacked and used by the receiving computer. While this approach works, it adds to the latency of the transmission.

A further problem with accessing the WWW using a wireless modem is the increased latencies that are introduced by the wireless network. A general trend is the wider the area served by a wireless data network, the lower the bandwidth (in bps) of the transmission. For example, present wireless communication systems in use in the United States are capable of transmitting 4,800 bits of data per second. This results in latencies up to as much as 10 seconds.

Related art on wireless WWW access exists at: 1. Carnegie Mellon University's Information Networking Institute, Wireless Andrew Initiative. 2. Rutgers University's Winlab, Dataman project. 3. University of Washington's CS&E, Mobisaic. 4. Xerox's Palo Alto Research Center, PDA and virtual office computing concepts. 5. Computer Networks & ISDN Systems Volume 0028, Number 1-2 ISSN:0169-7552, December '95, "PDAs as Mobile WWW Browsers", Gessler S., Kotulla A. 6. General Magic's, Magicap OS version of a WWW browser with enhancements for Telescript agent technology.

All of these projects and papers either require the modification of a browser, specification of new protocols (still based on TCP), or defining generic inter-networking specifications for connecting wireless and low-bandwidth networks to the Internet for WWW access.

Thus, there is a need for a method of translating TCP in connections over high-latency wireless and wireline networks.

Problem 2

A second problem is that current WWW access software does not provide standard mechanisms for compression, encryption, or filtering. Compression entails decreasing the size of transmissions of data over the network without changing the content of the information. Most proposals for compression support require external utilities from the browser to decompress the data, and then return usable output to the browser through the use of Multipurpose Internet Mail Extension (MIME, Nathaniel Borenstein et. al RFC 1521) types.

Encryption is the coding of data transmissions. Encryption helps to provide security since encrypted data transmissions are much more difficult for an unauthorized party to intercept and access. Unfortunately, it is unlikely that generic, open standards for these desirable services could be created to support all WWW client requests. Standards are evolving for encryption in WWW software (i.e., Secure Socket Layer (SSL)). However, at current levels of computer hacking, it is unlikely that any open standard for encryption will be able to maintain integrity for long.

Most advanced browsing technologies, therefore, have installed proprietary encryption schemes and are only capable of working between a WWW server that supports the encryption scheme. This option goes against the open standards design of the WWW.

Filtering refers to global control of a WWW response based on data size, type, or some other characteristic whereby a user can customize the receipt of data. Work is being done in this area through WWW search engines, specialized caching utilities on advanced browsers, etc.

The filtering referred to here is a global safety net for unwary users that could potentially misuse a wireless/low-bandwidth data network by requesting too much data, retrieving spurious information, or some other unwanted side effect resulting from a WWW request. For example, a user may request a data object from the WWW that a user is not aware is extremely large, and perhaps costly, to transmit. AS a safety net, the user may configure a filter to automatically prevent a particular request from being executed.

Thus, there is a need for an implementation of compression, encryption and filtering features in a WWW interface.

Problem 3

A third problem exists in that there is no standard way for WWW access software to receive asynchronous or unsolicited updates from the network. Existing browser technology is client based. The most popular browsers, such as the Netscape™, Mosaic™, Lynx™ browsers, as well as other less popular browsers, require users to initiate some form of request before response data will be delivered to the respective browser.

For example, it is desirable for a company providing access to the WWW to be able to remotely configure a subscriber's WWW access system from within the network. Since regular browsers do not offer this feature, subscribers must configure and update their access software manually. This may require the support of the service provider through a traditional voice customer support line or custom agent software on the user's host system.

Thus, there is a need for a WWW interface that can receive and implement unsolicited transmissions from the network or service provider, particularly to automatically configure software for accessing the network.

SUMMARY OF THE INVENTION

It is thus an object of the present invention to meet the above-described needs and others. It is an object of the present invention to provide a method and system for interfacing with the WWW that supports TCP/IP in a high-latency environment, provides compression, encryption and filtering services and accepts and implements unsolicited messages from the WWW or the service provider.

Additional objects, advantages and novel features of the invention will be set forth in the description that follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the system and method of the present invention may utilize a host computer having a browser and a local proxy in a first location, a remote proxy in a second location in communication with the local proxy through a low-bandwidth network, means for initiating a query on the browser and sending the query to the local proxy using an application layer protocol, means for converting the application layer protocol of the query into a transport protocol suitable for transmission over the low-bandwidth network, means for transmitting the query over the low-bandwidth network from the local proxy to the remote proxy, and means for converting the transport protocol into an application layer protocol suitable for execution of the query on the computer network.

It is also preferred that the system and method of the present invention include means for communicating the query to a network server, executing the query, and returning a data object to the remote proxy, means for converting the data object into a transport protocol suitable for transmission over the low-bandwidth network, means for transmitting the data object over the low-bandwidth network from the remote proxy to the local proxy, means for converting the transport protocol of the data object into an application layer protocol at the local proxy, and means for communicating the data object into the browser using the application layer protocol.

It is also preferred that the system and method of the present invention include means for creating a query script having settings for compression, filtering, and encryption, means for encapsulating the query script for transmission over the low-bandwidth network from the local proxy to the remote proxy, means for compressing, filtering, and encrypting the data object according to the settings in the query script, and means for placing the data object in a reply script for transmission over the low-bandwidth network from the remote proxy to the local proxy.

In a further aspect of the present invention, in accordance with its objects and purposes, the system of the present invention may also comprise a system for communicating with a computer network, comprising a host computer having a browser for a user interface, a local proxy means for communicating with the browser using an application layer protocol, the local proxy means having means for converting the application layer protocol into a transport protocol, and a remote proxy means for communicating with the local proxy means using the transport protocol. The remote proxy means includes means for converting the transport protocol into the application layer protocol, and means for communicating with the computer network using the application layer protocol.

BRIEF DESCRIPTION OF THE DRAWINGS

The present invention will become more clearly appreciated as the disclosure of the present invention is made with reference to the accompanying drawings, wherein.

DETAILED DESCRIPTION OF THE PREFERRED EMBODIMENT

Reference will now be made in detail to a preferred embodiment of the invention, an example of which is illustrated in the accompanying drawings.

The creation of the WWW is a computing revolution which also offers a potential catalyst for wireless data networks to become a direct participant in exploding Internet popularity. The present invention provides a method and system for interfacing a private computer or private computer network with the WWW which provides support for TCP/IP in a high-latency environment; compression, encryption, and filtering services; and the receipt and implementation of unsolicited messages transmitted by the service provider. The present invention also allows a Laptop or Personal Digital Assistant (PDA) direct access to the WWW from a mobile (wireless) terminal.

Figure 1:
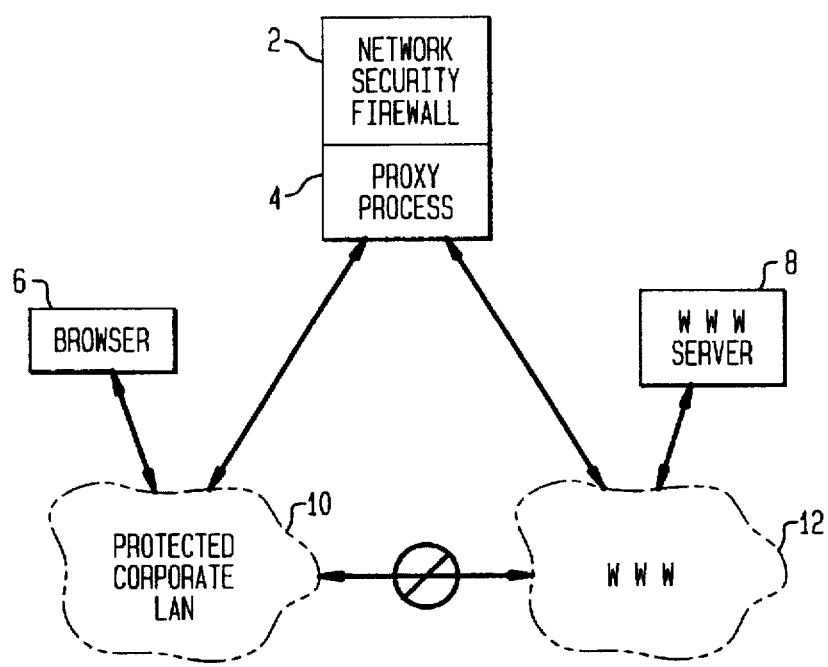
FIG. 1 is a block diagram showing the related art firewall interface between a private computer network and the WWW.

For example, the interface to the WWW of the present invention may be implemented by modifying a proxy, FIG. 1, element 4, to perform the required functions. The modified proxy would become a system of split proxies (sometimes referred to as Agent technology, as described in U.S. application Ser. No. 08/309,336) that could be implemented on a firewall, or can be an application running in the background on an individual computer, even a laptop, that can access the WWW via a wireless or wireline network.

Figure 2:
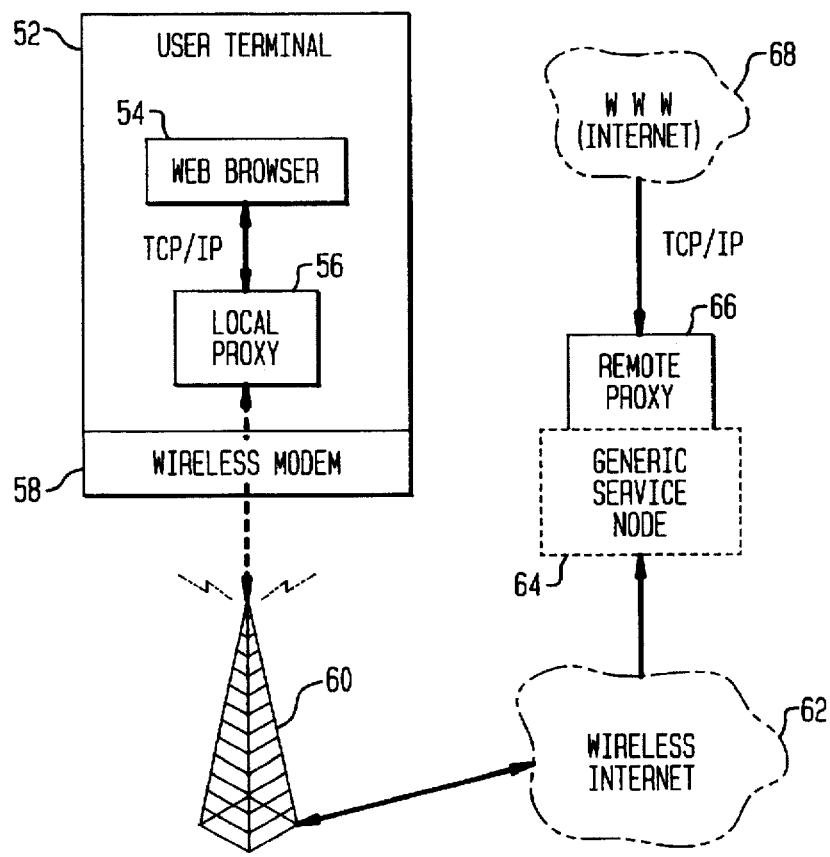
FIG. 2 is a block diagram showing the split proxy interface of the present invention.

Referring to FIG. 2, the interface of the present invention is a modified split proxy. A split proxy comprises a local proxy 56 and a remote proxy 66, which are software modules that enable translation and restoration of WWW requests.

A user operating a mobile terminal 52 is using a web browser 54 which communicates with the WWW using TCP/IP. The local proxy 56 is a software package that runs in the background on the user terminal 52. Where high latency is a problem, the local proxy 56, according to the principles of the present invention, will translate data requests/transmissions between the TCP/IP protocol used by the browser and a protocol robust enough to carry data across the communication network to the remote proxy.

In the illustrated embodiment of FIG. 2, the user is accessing the WWW through a wireless network. For example, a wireless modem 58 uses a low-bandwidth optimized protocol, such as AirBoss™ Wireless Transport Protocol, to communicate with base station 60. Thus, the local proxy 56 translates the low-bandwidth optimized protocol to TCP/IP.

The local proxy's encapsulated request script (see FIG. 5—General Browser Usage Flow), is transmitted through a wireless network 62 to the remote proxy 66. The remote proxy 66 makes the necessary protocol translations between TCP/IP and the low-bandwidth optimized protocol, such as AirBoss™ Wireless Transport Protocol, to connect the user to the WWW 68.

The present invention provides several methods by which standard web browsers that support proxy services can be adapted for wireless and low-bandwidth web browsing. The present invention will be explained by describing three sets of methods, which relate to the first, second, and third problems described above, respectively.

Method Set 1

The first problem to be overcome is the transmission of data using TCP/IP over networks that experience high latency, for example, more than approximately 3 to 5 seconds. The method and system used to solve Problem 1 involve protocol translation. Protocol translation refers to encapsulating TCP application requests that have a single request/response pair (i.e., HTTP, SMTP, Gopher, and WAIS) into a suitable connection-oriented protocol robust enough to function in the high latencies encountered over communication networks, particularly wireless and other low-bandwidth networks, that transmit the data.

The protocol translation is achieved by the split proxy. The local proxy is started on the host where a user also initiates a standard web browser. The web browser is configured, either by the user or the local proxy, to communicate with the local proxy. The latter configuration option is preferred because it hides reasonably sophisticated proxy configuration issues from the user. However, the proxy must know which browser is being used.

Once the local proxy and web browser are launched and configured correctly, the browser then funnels all WWW requests through the local proxy. The local proxy then takes the browser's WWW request and converts it into an appropriate low-bandwidth optimized protocol for the network being used (e.g., AirBoss™ Wireless Transport Protocol, based on UDP/IP).

The remote proxy is capable of receiving the converted script form from the local proxy and completing the operation on behalf of the original request made by the browser. Once the data is received at the remote proxy from the converted request, the data is encrypted, compressed, filtered based on the original script, and/or encapsulated into an optimized protocol and sent back to the local proxy (these services will be described in more detail in Methods 2 & 3 described below). The local proxy receives the encapsulated response, unpackages it, and returns the final response to the browser.

Figure 3:
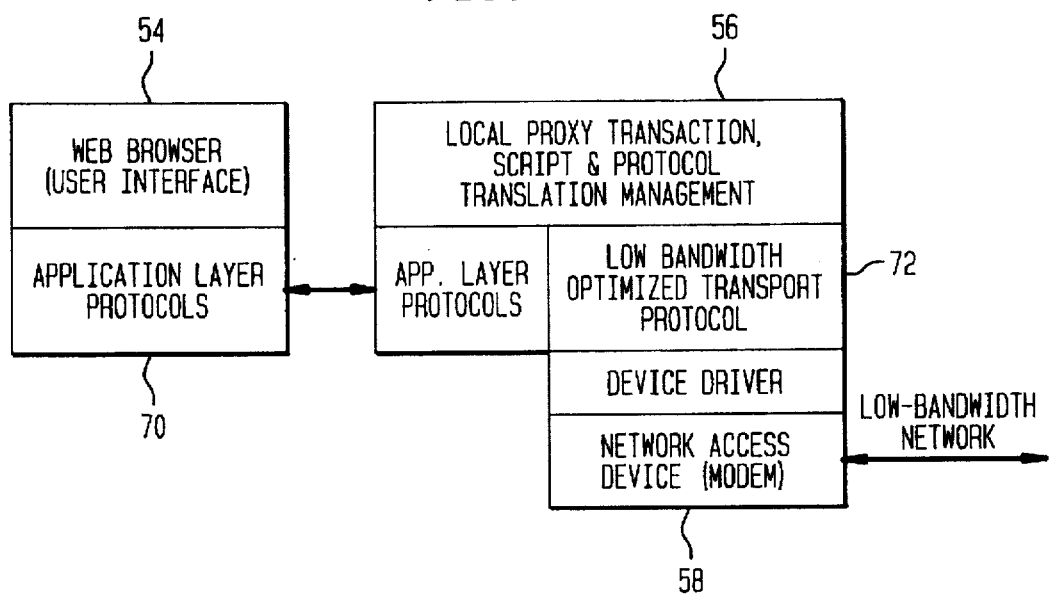
FIG. 3 is a schematic diagram of the protocol translation performed by the local proxy interface of the present invention.

Referring to FIG. 3, the example of a request for WWW data will be described. The web browser 54 outputs a request which is couched in the advanced OSI protocol layers or application layer protocols 70 which comprises TCP/IP. The request is transmitted to the local proxy 56 which translates the request into a low-bandwidth optimized protocol 72, such as AirBoss™ Wireless Transport Protocol, which is based on UDP/IP. The encapsulated request is then submitted via the network access device 58 (e.g., modem) to the low-bandwidth network.

Figure 4:
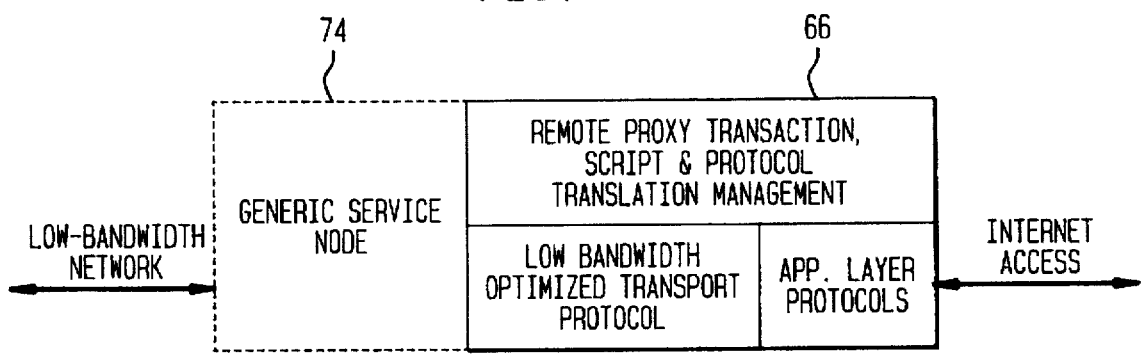
FIG. 4 is a schematic diagram of the protocol translation performed by the remote proxy interface of the present invention.

Referring to FIG. 4, the request traverses the low-bandwidth network to arrive at the generic service node 74. The encapsulated request is then submitted to the remote proxy 66 which translates the encapsulated request from the low-bandwidth optimized protocol (e.g., AirBoss™ Transport Protocol) to the application layer protocols originally created by the web browser, and submits the browser's request to the Internet.

Regarding the communication between the remote and local proxies, multi-threading is important. Multi-threading refers to a programming/operating system paradigm that allows applications to appear to do several operations at the same time. During development of the present invention, it was discovered that the split proxy should be capable of multi-threading request/response pairs. Since most WWW browsers support multi-threaded client request/responses, the split proxy should do the same to facilitate seamless integration into the WWW access regime.

Implementing multi-threading in the split proxy of the present invention requires a transaction system between the local and remote proxies to match the internal scripts that encapsulate a request with the response scripts destined for a browser. The precise transaction system implemented between the proxies is not important, and it will be obvious to one of ordinary skill in the art how such a transaction system may be structured based on the disclosure of the present invention. The protocol and transaction mechanism described in Method Sets 1 and 2 is based on the Personal Communications Internet work (PCI) system described in the '336 application.

The more sophisticated the transaction system, the better the system and method of the present invention becomes for enabling end-users to browse the WWW over low-bandwidth networks. The following methods of the present invention are based on this discovery.

A benefit of supporting multi-threaded request/response pairs is that multiple browsers can be supported on a host by a single local proxy.

Method Set 2

As the WWW developed and the existing protocols were layered on top of each other to meet the data transmission needs of users, web browsers were created to make use of the exiting protocols. In current WWW access software, the need for data security and compactness was largely overlooked. As a result, web browsers using TCP/IP do not provide for encryption, compression or filtering of data for transmission.

The main consortium for the WWW, W3C, has considered standards for securing transmission of data over the WWW. However, the problem with such web-wide standards is that, once they are announced, hackers begin to work their way through the protocol specification to find ways of defeating the security measures.

Accordingly, it is an object of the present invention that the proxy software include compression, encryption, and filtering tools in a proprietary regime that still makes use of all of the open nature of the WWW. Thus, the transaction system between the remote and local proxies, including compression and encryption algorithms, may be a proprietary system devised by a service provider for the use of its customers.

A filtering tool can also be implemented by the split proxy. Filtering, in the context of the present invention, refers to a global control on the low-bandwidth network. For example, when browsers submit a request for information, they generally do not know how much information is going to be retrieved. According to the principles of the present invention, the local proxy receives filtering configuration instructions from the user which are then transmitted to and implemented by the remote proxy. The remote proxy can then perform such functions as examining the response to a user's data request and stopping unduly large data objects, for example, from overwhelming the user's system.

In general, encryption and compression algorithms are better placed in between the local proxy and the remote proxy as opposed to placing such capabilities in a new web browser. As noted, such algorithms can then be protected in a proprietary regime. One of ordinary skill in the art could easily design encryption and compression algorithms based on well-known principles for any service provider desiring a unique set of algorithms.

On the other hand, despite their vulnerability, open, widely-known standards for such algorithms, such as have been considered by the W3C, have advantages, such as, for example, interoperability. Interoperability allows different producers of proxies to make remote and local proxies that function together. This also allow manufacturers of different computer platforms to bridge their platforms with others.

A script to implement compression, encryption and filtering, whether proprietary or open, should include fields to do at least the following:

A. Support encryption. For example, MD5 cipher algorithms for secure monetary transactions of electronic data.

B. Support multiple types of compression (compression choice should be based on the type of data contained in the script). For example, LZW compression algorithms can be used on textual data.

C. Support at least negative filters or positive filters. For example, one or more of the following filtering algorithms can be used:

Negative filters - A response script should not include any binary data or a response script should not be greater than this size.

Positive Filters - A response should include all lines of text with "wireless" in it.

If at any point along the path between the remote and local proxies there is some failure, particularly in the wireless environment, the transaction system between the local and remote proxies must be able to respond appropriately. For example, if the script cannot be submitted to the wireless network, or the script fails to get to the remote proxy, or the remote proxy is incapable of getting access to the Internet, the transaction system must respond appropriately.

Method Set 3

The final problem arises because WWW access software, the web browser, was originally designed to act as a client. Client software on its own generally is not capable of receiving asynchronous or unsolicited updates from the network. This is a problem if a service provider would like to provide subscribers with access software and then to remotely (from within the network) manage the configuration of that software for the user. This feature of the present invention provides a way for large service providers to offer WWW access that is scalable to the needs of the customer.

As noted, the web browsers currently in use are not designed to receive and implement such updates. The service provider may instead distribute new updated software. If the user is operating on a large scale, implementing an update may even require a service technician dispatched to reinstall the software, reconfigure the software, and troubleshoot it. Alternatively, the customer may have to call a customer support line and wait for verbal instructions to support installation of the update.

According to the principles of the present invention, a simpler and more efficient solution is provided by a service provider using the split proxy interface. Using the encryption and security protocols designed for the service provider's system, the service provider can access the user's WWW access software on the user's own system and immediately install, configure or update that software. This method may also incorporate messages to the user to indicate the action taken by the service provider.

The solution of the present invention is to configure the local proxy to be capable of asynchronous/unsolicited receipt of scripts that are designed to modify an end user's host system for things like software updates, configuration changes, or new service advertisements. Ideally, the local proxy should be running constantly in the background of the user's system to receive and implement such communications, even if the web browsing software is not running.

Since the local proxy is not part of the browser and should always be running to receive these asynchronous network uploads, the present invention was designed to be small and modular to limit the amount of system resources. This feature protects against unwanted interaction with other installed software (i.e., memory allocation, IP port assignment, etc.).

Preferred Implementation

Figure 5:
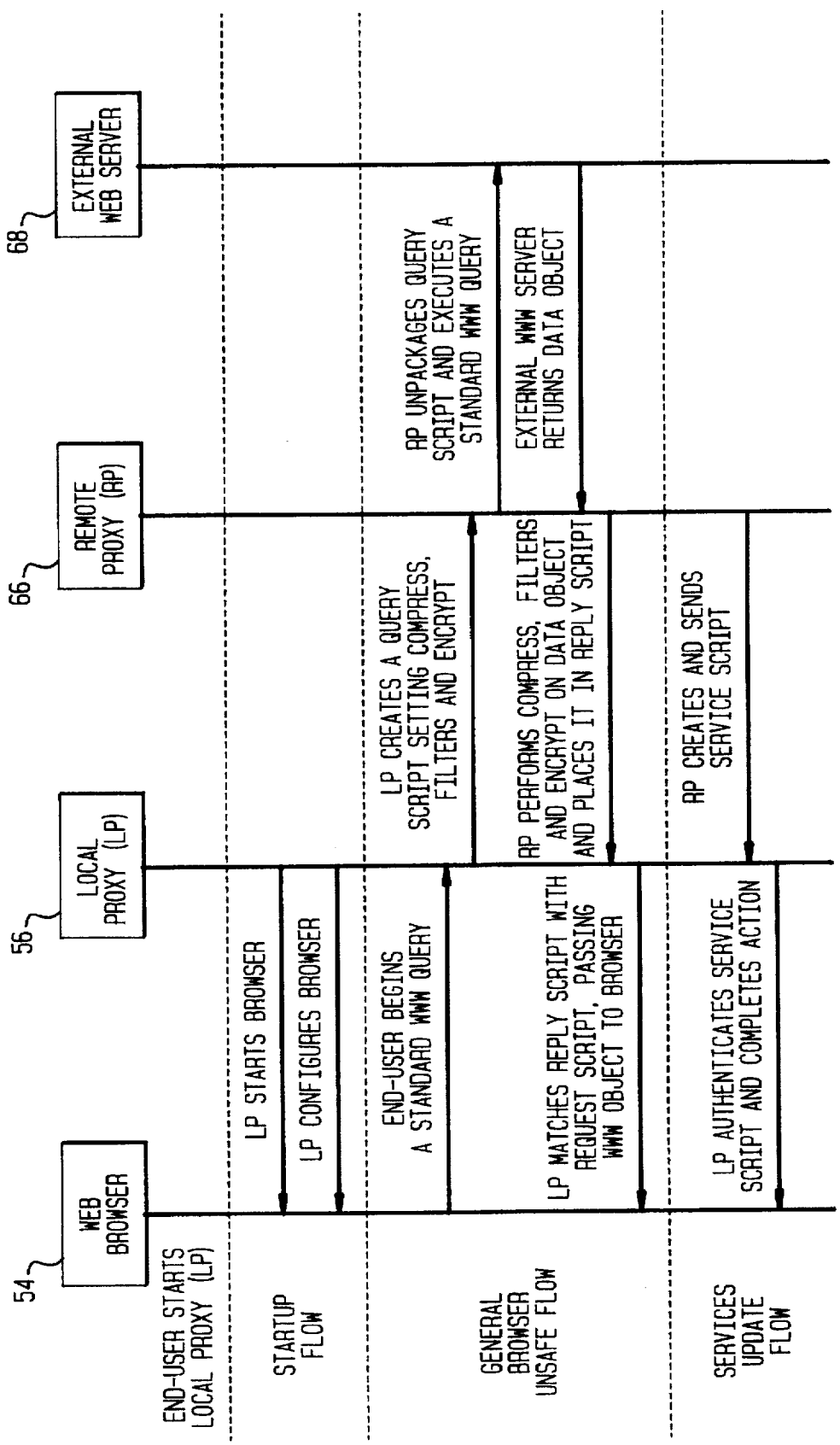
FIG. 5 is a flow chart showing the implementation of the proxy interface of the present invention.

Referring to FIG. 5 of the drawings, a flow diagram of the present invention will be described. The flow diagram of FIG. 5 has a series of entities listed at the top corresponding to the main components of the present invention, including the web browser 54, the local proxy 56, the remote proxy 66, and the external web server of the WWW 68. The flow diagram illustrates the interaction of these components during the startup process, the general browser usage process, and the service update process, respectively.

The web browser 54 and the local proxy 56 are designed to run co-resident on the same host computer or user terminal 52. The remote proxy 66 and the external web server, however, do not necessarily need to be co-resident. The remote proxy 66 must only be able to access and communicate with the external web server.

The arrows in FIG. 5 represent communication or transfer of data from one entity to another. The arrow heads specify the direction in which the action is directed. The lines from top to bottom represent the timeline and the sequence with which the process steps occur.

The first flow shown in FIG. 5 is the start-up flow. This is basically how the system is activated on the end user's host computer. It is assumed that the remote proxy and the external web server are already running in all of these flow descriptions (those systems can be maintained and started by a system administrator with no interaction from the end user's point of view). The first action that occurs is that the end user starts the local proxy. That simply means launching an application that starts up and runs in the background of a multi-threaded operating system. The operating system can be, for example, the Windows™ Version 3.1 operating system.

After the local proxy is started, the local proxy has two responsibilities. If the browser type is specified on the user's host computer, the local proxy should configure and start the browser. Some browsers must be configured before they are launched, while other browsers must be launched first and then configured. This is dependent on which browser type is being used. The browser can be any conventional browser type that supports proxy services.

If the browser type is not known, the end user will have to launch and configure the browser manually for the local proxy. In this case, the end user must know enough information about the web browser that he is using to be able to manually configure it for proxy services.

The second flow shown on FIG. 5 is a general browser usage flow. This flow shows the process steps of the present invention after the browser has been started and configured. The end user first submits a standard web request. That basically means the user points and clicks on a hyperlink or opens up a dialog box and enters what is typically called a universal resource locator (URL). For example, this is how the Internet community identifies and accesses data objects on the WWW.

The next step in the flow for the general browser usage is that the query launched from the browser is submitted to the local proxy. The local proxy creates a query script, and places settings in that script defining the type of compression to be used on the data object or the types of compressions that are available. The local proxy also places settings in the script for the filters and the encryption type to be applied to that data object. The settings provide security and also give the user control of the information that will be returned in response to the query.

After that script is created, it is delivered to the remote proxy. The remote proxy parses the query script and extracts the packaged query that was originally submitted by the browser. The remote proxy then executes the query in a standard web data object request.

The external web server, after receiving the query, will return the appropriate data object associated with the query. No other special enhancements are needed at that point. That is just a traditional client to server request on the computer network that can use any appropriate WWW protocols. For example, hypertext transfer protocol, file transport protocol, simple mail transport protocol, or post office protocol can be used.

After the data object has been returned to the remote proxy, the remote proxy applies the compression, filters, and encryption that were specified in the original query script. Those include the actions to be run on the data object to put the data object into the correct form for delivery to the local proxy. The compression, filters, and encryption are formulated into a reply script.

After the actions are completed and delivered to the local proxy, the local proxy matches the reply script with the request script. Once the reply script is matched with the request script, it will know the appropriate browser and place to deliver that information to the browser. The local proxy then parses through the reply script and extracts the internal data object. Thus, two things need to happen with the reply script in the local proxy. The reply script must be matched with the request, and the local proxy must extract the data object out and deliver it to the appropriate place in the operating system so that the browser can display the object in its viewer.

The third flow shown in FIG. 5 is a service update or a service script flow. This is a situation where a network administrator that is interested in implementing updated services would be able to remotely from within the network configure an end user's host system. The remote proxy creates a service script. For example, if a new HTML home page is to be delivered and configured on the end user's remote system, a service script would be created that instructs the local proxy to write an HTML file into the distribution. The service script would contain the HTML page as the data object and once the script is completed in an appropriate form, it would be delivered to the local proxy.

The local proxy has a responsibility of parsing through the service script, pulling out both the action and any associated data objects with that action, and completing the requested action. So, to finish the example, the local proxy would parse through to find out what action was requested (writing a new HTML home page), extract the data object (a new HTML home page), and then write the data object to the local file distribution. The arrow indicates that it is sometimes appropriate to display information into the browser. Sometimes that is not going to be possible, and the local proxy will display dialog boxes or other user interface notification of appropriate actions. The browsers that are capable of receiving asynchronous updates can be notified at that point, and the local proxy will initiate that action and send any appropriate user interface controls to the browser to display to the user the actions that have just been executed on the local host system.

The interface between a user and the WWW provided by the present invention provides protocol translation, compression, encryption, filtering and automatic service updates that results in a much improved connection to this extremely valuable resource. Regarding compression, there could be a direct savings to an end user for demanding the proxy services of the present invention in a wireless networking environment. Most wireless network providers have per packet charges or flat rates for bulk usage (e.g., fixed rate for up to 1 MB of data). A direct savings could be realized when data on that link is compressed. Empirical measurements show that standard HTML data can be regularly compressed to 50–60% of the original payload, including script overhead. This means a customer can retrieve twice as much WWW data for the same price.

The present invention provides a way for a network administrator to directly manage a customer's host configuration, foregoing less reliable technical support lines to troubleshoot problems or requiring the customer to learn sophisticated settings for software. Also, new service deployment is automated by the present invention.

The technology embodied in the present invention is most suitable for use by ISPs, manufacturers of PDAs and Laptops, Wireless Network Providers, Wireless System Integrators, and Telephony providers wishing to become ISPs. The technology can also be integrated with other product lines to enhance projects that have strong ties to the WWW and have mobility components.

It will be appreciated that the present invention is not limited to the exact construction or process steps that have been described above and illustrated in the accompanying drawings, and that various modifications and changes can be made without departing from the scope and spirit thereof. It is intended that the scope and spirit of the invention only be limited by the appended claims.

APPENDIX A

Glossay of Acronyms

CDPD Cellular Digital Packet Data
FTP File Transfer Protocol
HTML Hyper Text Markup Language
HTTP Hyper Text Transport Protocol
IP Internet Protocol
ISDN Integrated Services Digital Network
ISG Integrated Services Gateway
ISP Internet Service Providers
LAN Local Area Network
LP Local Proxy
LZW Lev-Zempel-Welch
OSI Open Systems Interconnection
PCI Personal Communications Internetwork
PDA Personal Digital Assistant
RP Remote Proxy
SMTP Simple Mail Transfer Protocol
SSL Secure Socket Layer
TCP Transmission Control Protocol
UDP User Datagram Protocol
URL Universal Resource Locator
WAIS Wide Area Information Search
WWW World Wide Web

What is claimed is:

1. A method for communicating between a host computer with a client application in a first location and a server application in a second location over a communication path, said method comprising:

placing a local proxy at said first location;
placing a remote proxy at said second location in communication with said local proxy through said communication path;
initiating a query on said client application and sending said query to said local proxy using an application layer protocol;
converting said application layer protocol of said query into a transport protocol;
transmitting said query in said transport protocol over said communication path from said local proxy to said remote proxy; and
converting said transport protocol of the transmitted query into an application layer protocol for execution of said query on said server application.

2. The method according to claim 1 wherein said communication path is a high latency communication path.

3. The method according to claim 1 wherein said communication path is a wireless network.

4. The method according to claim 1, further comprising the steps of:

executing said query at said server application and returning a data object to said remote proxy.

5. The method according to claim 4, further comprising the steps oft converting said data object into a transport protocol;
transmitting said data object in said transport protocol over said communication path from said remote proxy to said local proxy;
converting said transport protocol of the transmitted data object into an application layer protocol at said local proxy; and
communicating said data object into said client application using said application layer protocol.

6. The method according to claim 1, further comprising a start up operation comprising the steps starting said local proxy on said host computer; and
configuring and starting said client application using said local proxy.

7. The method according to claim 1, wherein said step of converting said application layer protocol of said query further comprises the steps of:

creating a query script having settings for compression, filters, and encryption; and
encapsutating said query script for transmission over said communication path from said local proxy to said remote proxy.

8. The method according to claim 7, wherein said step of converting said application layer protocol of said data object further comprises the steps of:

compressing, filtering, and encrypting said data object according to said settings in said query script; and
placing said data object in a reply script for transmission over said communication path from said remote proxy to said local proxy.

9. The method according to claim 8, further comprising the steps of:

matching said reply script with said query script upon receiving said reply script in said local proxy;
delivering said reply script to said client application;
unpackaging said data object from said reply script; and
displaying said data object at said first location.

10. The method according to claim 1, further comprising the steps of:

creating a service script at said remote proxy;
transmitting said service script from said remote proxy to said local proxy;
parsing said service script and extracting a requested action and data object from said service script; and
executing a service action at said local proxy.

11. A system for communicating between a host computer with a client application in a first location and a server application in a second location through a communication path, said system comprising a local proxy in said first location;
a remote proxy in said second location in communication with said local proxy through said communication path;

means for initiating a query on said client application and sending said query to said local proxy using an application layer protocol;

means for converting said application layer protocol of said query into a transport protocol;

means for transmitting said query in said transport protocol over said communication path from said local proxy to said remote proxy; and means for converting said transport protocol into an application layer protocol for execution of said query on said server application.

12. The system according to claim 11, further comprising means for executing said query and means for returning a data object to said remote proxy.

13. The system according to claim 12, further comprising:

means for converting said data object into a transport protocol;

means for transmitting said data object over said communication path from said remote proxy to said local proxy;

means for converting said transport protocol of said data object into an application layer protocol at said local proxy; and means for communicating said data object into said client application using said application layer protocol.

14. The system according to claim 11, further comprising:

means for starting said local proxy on said client application; and means for configuring and starting said client application using said local proxy.

15. The system according to claim 11, wherein said means for converting said application layer protocol of said query further comprises:

means for creating a query script having settings for compression, filters, and encryption; and means for encapsulating said query script for transmission over said communication path from said local proxy to said remote proxy.

16. The system according to claim 15, wherein said means for converting said application layer protocol of said data object further comprises:

means for compressing, filtering, and encrypting said data object according to said settings in said query script; and means for placing said data object in a reply script for transmission over said communication path from said remote proxy to said local proxy.

17. The system according to claim 16, further comprising:

means for matching said reply script with said query script upon receiving said reply script in said local proxy;

means for delivering said reply script to said client application;

means for unpackaging said data object from said reply script; and means for displaying said data object at said first location.

18. The system according to claim 11, further comprising:

means for creating a service script at said remote proxy;

means for transmitting said service script from said remote proxy to said local proxy;

means for parsing said service script and extracting a requested action and a data object from said service script; and means for executing a service action at said local proxy.

19. The system according to claim 11, wherein said communication path is a high latency communication path.

20. The system according to claim 19, wherein said communication path comprises a wireless network.

21. A system for communicating with a remote server, said system comprising:

a host computer having a client application for a user interface;

a local proxy for communicating with said client application using an application layer protocol, said local proxy means having means for converting said application layer protocol into a transport layer protocol; and a remote proxy for communicating with said local proxy using a transport protocol, said local proxy including means for converting said transport protocol into said application layer protocol and said remote proxy including means for communicating with said remote server using said application layer protocol.

22. The system according to claim 21, wherein said local proxy and said remote proxy communicate through a high latency communication path.

23. The system according to claim 21, wherein said local proxy and said remote proxy communicate through a wireless network.

24. The system according to claim 21 wherein said proxies are provided with at least one encryption algorithm for encrypting data transmissions.

25. The method in accordance with claim 1 further comprising providing said proxies with at least one encryption algorithm for encrypting data transmissions.

26. The system according to claim 21 wherein said remote proxy filters data transmissions to said host computer.

27. The method according to claim 1 further comprising filtering data transmission from said server application to said host computer with said remote proxy.

28. The system according to claim 21 wherein said proxies compress data transmissions between said server application and said host computer.

29. The method according to claim 1 further comprising the step of compressing data transmissions between said server application and said host computer with said proxies.

* * * * *

UNITED STATES PATENT AND TRADEMARK OFFICE
Certificate

Patent No. 5,673,322

Patented: September 30, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard R. Hovey; Michael Kramer; and Yang-Wei Wang.

Signed and Sealed this Second Day of June, 1998.

THOMAS H. TARCZA
*Supervisory Patent Examiner*
Art Unit 3642